United States Patent [19]
Games

[11] 3,780,280
[45] Dec. 18, 1973

[54] RESOLUTION OF A TRIANGLE FROM HYPOTENUSE AND ONE SIDE

[75] Inventor: John E. Games, Granby, Conn.

[73] Assignee: United Aircraft Corporation, East Hartford, Conn.

[22] Filed: July 3, 1972

[21] Appl. No.: 268,255

[52] U.S. Cl............ 235/190, 235/150.26, 235/186, 244/77 B
[51] Int. Cl. .......................... G06g 7/22, G06g 7/78
[58] Field of Search............ 235/186, 189, 190–192, 235/150.26, 150.27; 343/10, 12, 112 C, 112 A, 112 D; 244/77 R, 77 B, 77 C

[56] References Cited
UNITED STATES PATENTS

| | | | |
|---|---|---|---|
| 3,398,267 | 8/1968 | Hattendorf.................... | 235/150.26 |
| 3,070,307 | 12/1962 | Helgeson et al. ............. | 235/150.26 |
| 3,478,310 | 11/1969 | Cone, Jr. ..................... | 235/150.27 X |
| 3,504,165 | 3/1970 | Richardson et al. ........ | 235/150.27 X |
| 3,666,929 | 5/1972 | Menn......................... | 235/150.26 X |

Primary Examiner—Joseph F. Ruggiero
Attorney—Melvin Pearson Williams

[57] ABSTRACT

A DC voltage having an amplitude proportional to the length of one side of a right triangle is compared with a sine wave, of arbitrary frequency, having a peak value proportional to the length of the hypotenuse of the triangle so as to generate a square wave of the same frequency as the sine wave, and having a phase relationship to the sine wave which is proportional to the angle opposite the known triangle side. The square wave is then used as the phase reference for synchronously demodulating the sine wave, the average value of the demodulator output being equal to the base, or unknown side, of the triangle. In addition, the sine wave may be squared-up and the original square wave and the squared-up wave used to set and reset a bistable device to provide a pulsewidth modulation indication of the angle opposite the known side. This may be filtered to provide a DC voltage proportional to the angle.

5 Claims, 3 Drawing Figures

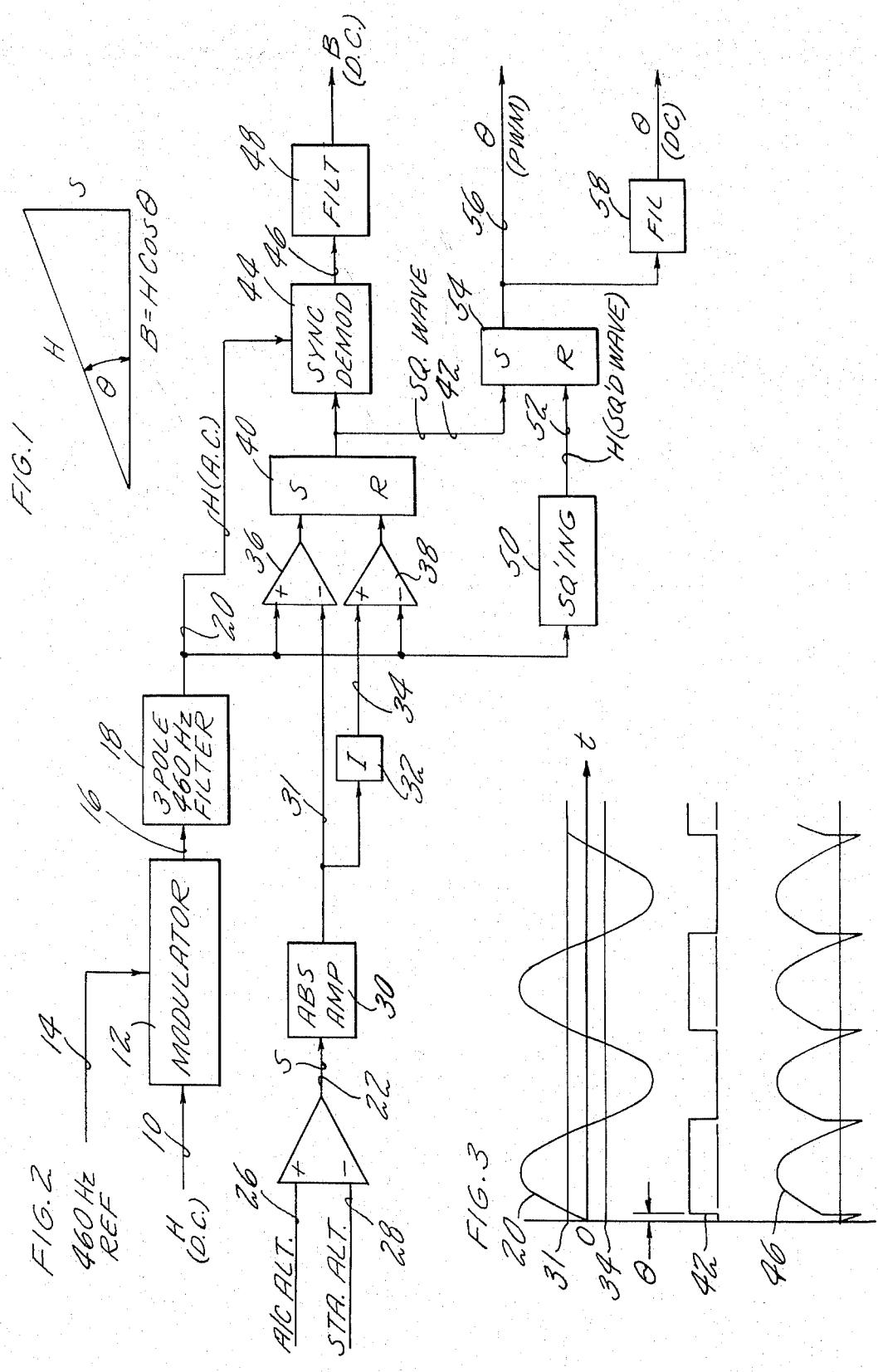

RESOLUTION OF A TRIANGLE FROM HYPOTENUSE AND ONE SIDE

BACKGROUND OF THE INVENTION

1. Field of the Invention

This invention relates to trigonometric computers, and more particularly to apparatus for solving a triangle from the hypotenuse and one known side.

2. Description of the Prior Art

As an example of a field in which trigonometry plays an important role, modern aircraft navigation typically utilizes signals from ground stations to determine distance and relative bearing to the station. Thereafter, this information may be utilized to determine courses and distances to arbitrary way points along the desired flight path of the aircraft.

The distance signal derived from the ground station is indicative of the actual distance between the aircraft and the ground station. Since modern aircraft fly at relatively high altitudes, it is common to convert the slant range distance derived from the distance measuring equipment (DME) to a horizontal range between the station and the projection of the aircraft on a plane at station altitude. Heretofore, this has been achieved by using synchros, a rotor of which is excited by a signal having a magnitude equal to the slant range distance, the rotor being turned until one of the resolver output components has a magnitude equal to the difference in altitude between the aircraft and the ground station, which automatically provides, at the other quadrature winding output a voltage proportional to horizontal distance. Such devices are expensive, heavy, and not well suited to airborne electronic equipment. Although vectors can be resolved with electronic circuits into their cartesian coordinates, simple and reliable circuitry for solving triangles from the hypotenuse and one side is not readily available.

SUMMARY OF THE INVENTION

The object of the invention is to provide simplified apparatus for solving a triangle from the hypotenuse and one side.

According to the present invention the amplitude of a sinusoidal voltage proportional to the hypotenuse of a right triangle is compared with the amplitude of a DC voltage proportional to a side of the triangle, to generate a square wave of the same frequency as the sinusoidal voltage, phase shifted therefrom by an amount proportional to the angle opposite the known side; the square wave may be compared directly in phase with the sine wave to provide a signal proportional to the angle, and the square wave may be used as a phase reference to synchronously demodulate the sine wave to provide a signal proportional to the unknown side or base of the triangle.

The present invention provides a relatively simple and heretofore unavailable resolution of triangles employing electronic circuitry which is readily available in the art. The present invention provides a highly accurate triangle solution which may be implemented with rugged and reliable components.

In one useful utilization of the present invention, the AC voltage is proportional to slant range between an aircraft and a VOR/DME station, and the DC voltage is proportional to the difference in altitude between the aircraft and the station so that the output is the horizontal distance to the station. The invention thus provides a great advantage in circuitry which is much less expensive and is very light in weight for utilization in airborne navigation equipment.

Other objects, features and advantages of the present invention will become more apparent in the light of the following detailed description of a preferred embodiment thereof, as illustrated in the accompanying drawing.

BRIEF DESCRIPTION OF THE DRAWING

FIG. 1 is a simplified illustration of the trigonometric relationships involved in the invention;

FIG. 2 is a schematic block diagram of a preferred embodiment of the present invention; and FIG. 3 is a diagram of a plurality of voltage waveforms on a common time base.

DESCRIPTION OF THE PREFERRED EMBODIMENT

Referring now to FIG. 1, a right triangle is shown as including a hypotenuse H, a side S, a base B, and an angle $\theta$ opposite to the side S. In accordance with the present invention, from known values of H and S, both B and $\theta$ are determined.

Referring now to FIG. 2, a DC voltage the magnitude of which is proportional to the length of the hypotenuse H is applied on a signal line 10 to a modulator 12 which also receives a 460 Hz reference signal on a line 14. The signal on the line 10 may comprise, for instance, the DC voltage output from a DME which is proportional to the slant range of an aircraft to a VOR/DME ground station. The modulator 12 simply converts the DC signal to a square wave of 460 Hz. The modulator may otherwise be thought of as a chopper; in the present invention it is not material as to whether the square wave output of the modulator 12 is symmetrical with respect to ground, or is chopped from some peak value to ground. The output of the modulator 12 is applied over a signal line 16 to a filter 18 which may for instance comprise three poles thereby providing 30db attenuation or greater to third order and higher harmonics, thus supplying a relatively pure sinusoidal wave at its output line 20.

A DC signal having a magnitude proportional to the length of the side S is provided on a signal line 22. This may comprise, for example, the output of a difference amplifier 24 which responds to voltages on lines 26, 28 which are proportional to the aircraft altitude and the altitude of the VOR/DME station, respectively. Of course, it should be understood that the values of H and S may represent other than slant range and altitude differential with respect to an aircraft and a related ground station; in fact, they may represent may triangle. The S signal on line 22 is applied to an amplifier 30 which may preferably comprise an absolute amplifier thereby providing an output of a single polarity regardless of the polarity of the input; such an amplifier is simply a precision rectifier (one having insignificant rectifier element drops, and so forth) with a gain of unity or with some other suitable gain. However, as is described more fully hereinafter, no amplifier need actually be used if so desired, in dependence upon any given utilization of the present invention. The output of the amplifier 30 is fed over a signal line 31 to an inverter 32 to invert the sense of the DC signal so as to provide a signal on a line 34 of opposite polarity to that on the line 31. Signals on the line 20, 31 and 34 are applied to a pair of comparators 36, 38. The comparator 36 provides an output when the signal on the line 20 (the instantaneous magnitude of the sinusoidal representation of H) becomes greater than the signal on the line 31 (the DC signal representing the magnitude of S). This causes a bistable device 40 to be set. Thereafter, when the sine wave acquires an instantaneous magnitude more negative than the DC value on the line 34 the comparator 38 will operate to reset the bistable device 40 thereby providing a square wave on a line 42 at the output of the bistable device 40 which is at the same frequency as the sinusoidal representation of H (and therefore the same as the frequency of the arbitrary sinusoidal reference signal on the line 14). This is illustrated in FIG. 3 which shows that the bistable device 40 provides an output on the line 42 during the portion of time which is between the time that the positive portion of the sine wave on the line 20 exceeds the DC Value on the line 31 to the point in time where the negative portion of the sine wave on the line 20 becomes as negative as the DC value on the line 34.

The square wave on the line 42 is applied to the reference phase input of a synchronous demodulator 44 which also receives, at its signal input, the AC signal on the line 20. As is known, the synchronous demodulator essentially passes the signal input to its output unchanged when the reference phase is positive, and inverts the input signal when the reference phase is negative. This provides a signal at the output line 46 of the synchronous demodulator (as shown in FIG. 3) which is basically half sine waves which undergo a phase reversal at a point in time commensurate with the angle $\theta$. Thus for $\theta$ equal to 0° the signal on the line 46 would be pure half sinusoids, all positive. As $\theta$ approaches 90° the phase reversal would occur half way through the half-sinusoids so that the positive and negative portions of the wave would be equal, thus cancelling out and providing a voltage on the line 46 which is substantially zero. It is shown hereinafter, that the average value of the voltage on the line 46 is proportional to the base B and, as expected, B is maximum for the smallest angles of $\theta$ and approahces zero as $\theta$ approaches 90°.

The following mathematical relationships are explanatory of the operation of the invention as described hereinbefore. The mathematical expression for the sine wave representative of H on the line 20 is:

$$H(t) = KH \sin wt \quad (1)$$

where $w$ is the instantaneous phase of the sinusoidal reference signal on the line 14, and $K$ is a proportionality factor between the DC output of the DME on line 10 and the peak value of the AC Signal on the line 20. At the point in time when the comparator circuit 36 sets the bistable device 40, the signals on the lines 20 and 31 are equal so that $$KH \sin wt = ks \quad (2)$$

where $k$ is the gain of the absolute amplifier 30 and can be adjusted to be equal to $K$ so that $$H \sin wt = S \quad (3)$$

or $$\sin wt = S/H \quad (4)$$

In FIG. 1 it is seen that $$S/H = \sin \theta, \quad (5)$$

so that at the time when the voltages on the lines 20 and 31 are equal $wt$ is therefore equal to $\theta$.

As is known, the output of a synchronous demodulator (which is also known as a phase sensitive detector or phase sensitive demodulator) is equal to the integral of the wave divided by the time base.

$$B = \frac{H}{2\pi} \left\{ \int_\theta^{\pi+\theta} \sin wt\, dt + \int_{\pi+\theta}^\theta -\sin wt\, dt \right\} \quad (6)$$

$$= \frac{H}{2\pi} \{[-\cos wt]_\theta^{\pi+\theta} + [\cos wt]_{\pi+\theta}^\theta\} \quad (7)$$

$$= H/2\pi \{[-\cos(\pi+\theta), +\cos \theta] + [\cos \theta - \cos(\pi+\theta)]\} \quad (8)$$

since $$\cos(A+B) = \cos A \cos B - \sin A \sin B \quad (9)$$

$$B = H/2\pi \{[-\cos \pi \cos \theta - \sin \pi \sin \theta + \cos \theta] + [\cos \theta - \cos \pi \cos \theta + \sin \pi \sin \theta]\} \quad (10)$$

since $$-\cos \pi = 1 \text{ and } \sin \pi = 0 \quad (11)$$

$$B = H/2\pi \{[\cos \theta - 0 + \cos \theta] + [\cos \theta - \cos \theta + 0]\} \quad (12)$$

$$= 4H/2\pi \cos \theta = 2H/\pi \cos \theta = 2B/\pi \quad (13)$$

Thus the average value of the signal on the line 46 is proportional (by $2/\pi$) to the base of the triangle. This may be passed through a suitable low pass filter 48 so as to derive a DC signal on an output line 49 which is proportional to the length of the base B.

It should be understood that this aspect of the invention has utility in and of itself since, for instance, the base B will represent horizontal distance to a ground navigation station when the value H is made proportional to the slant range to the station and the value S is made proportional to the difference in altitude between the station and the aircraft. However, the invention also provides a simple means of solving for the angle $\theta$ by utilizing a square wave derived from a squaring circuit (which is simply a hard-limited, high gain amplifier) which is of the same phase and frequency as the sinusoidal value of H on the line 20. Thus the signal on the line 20 is applied to a circuit 50 to provide a squared-up wave on a line 52 which is of the same phase and frequency as the signal on the line 20. Utilizing the square wave signal on the line 42 to set a bistable device 54 and the squared-up sinusoidal wave on the line 52 to reset the bistable device 54 provides an output signal on a line 56 which is pulsewidth modulated proportional to the difference in phase between the two signals, which in turn is proportional to the angle $\theta$. If desired, the signal on the line 56 may be passed through a filter 58 so as to provide a DC signal proportional to $\theta$.

Thus the inverter 32, the comparators 36, 38 and the bistable device 40 comprise means for providing a square wave on the line 42 which is of the same frequency as the sinusoidal wave on the line 20 (which represents a hypotenuse) but is phase shifted therefrom by an amount proportional to an angle $\theta$ which is opposite to a side S of the triangle, and this means does so in response to a DC signal on the line 31 which is proportional to the side S and the AC signal on the line 20 which is proportional to the hypotenuse H. This square wave is then used as a reference phase to synchronously demodulate the AC wave representative of the hypotenuse so as to provide a signal, the average value of which is proportional to the base B of the triangle. The square wave signal may also be utilized for phase comparison with a squared-up version of the sinusoidal hypotenuse signal so as to provide a signal indicative of the angle $\theta$ itself.

Since the period of the sinusoidal hypotenuse signal is known to be exactly that of the reference signal on the line 14, rather than resetting the bistable with a comparator circuit 38, it could be reset precisely one-half period later by timing circuit means in any well known fashion. As described hereinbefore, the absolute amplifier 30 may be utilized so as to provide a scaling factor to cause cancellation of the proportionality between the peak value of the sinusoidal hypotenuse signal H and the DC input signal on the line 10. On the other hand, since the filter 18 may comprise active filters, the proportionality factor could be cancelled therein by causing the total proportionality to be one. In such a case, no adjustment of the factor S need be made in the absolute amplifier 30, and, there would be no need for the absolute amplifier 30 if one desired not to use it. This is because of the fact, as illustrated in FIG. 3, assuming positive S and positive H, the value of $\theta$ appears as a phase lag between the square wave on the line 42 and the sinusoidal wave on the line 20. If S were negative (which could occur if there were no absolute amplifier 30 and the relative application of the signals to the difference amplifier 24 are appropriate) then the value $\theta$ would appear as a phase lead of the square wave signal on a line 42 relative to the sinusoidal signal on the line 20. However this would still give the same average value output of the synchronous demodulator 44 so it would be immaterial. In other words, either an absolute amplifier, an amplifier which is sensitive to sign, or no amplifier at all may be utilized as desired. The important thing is that the present invention operates on the sinusoidal hypotenuse signal on the line 20 and the DC side signal on the line 31 so as to provide a signal having a value proportional to the base, or to provide a signal proportional to the angle opposite to the side.

Additionally, although the invention has been shown and described with respect to a preferred embodiment thereof, it should be understood by those skilled in the art that the foregoing and various other changes and omissions in the form and detail thereof may be made therein without departing from the spirit and the scope of the invention.

Having thus described a typical embodiment of my invention, that which I claim as new and desire to secure by Letters Patent of the United States is:

1. Apparatus for resolving an unknown element of a right triangle from a known hypotenuse and a known side comprising:
   first means presenting a sinusoidal signal, the peak magnitude of which is proportional to the length of the hypotenuse of the triangle;
   second means providing a DC signal the magnitude of which is proportional to the length of a known side of the triangle;
   third means connected for response to said first and second means for generating a square wave signal at the same frequency as said sinusoidal signal but phase shifted therefrom in an amount proportional to the relative magnitudes of said sinusoidal signal and said DC signal; and
   fourth means connected to said first means and said third means and responsive to said sinusoidal signal and to said square wave signal for providing an output signal proportional to an additional parameter of said triangle.

2. Apparatus according to claim 1 wherein said fourth means comprises means for synchronously demodulating said AC signal utilizing said square wave signal as a reference phase, the output of said synchronous demodulating means comprising a signal, the average magnitude of which is proportional to the base of the triangle.

3. Apparatus according to claim 1 wherein said fourth means comprises:
   fifth means connected for response to said first means for providing a squared-up signal at the same frequency and phase as said sinusoidal frequency; and
   sixth means connected to said third means and said fifth means and responsive to said square wave signal and said squared-up signal for generating a signal proportional to the angle of the triangle opposite to the known side.

4. Apparatus according to claim 3 wherein said sixth means comprises a bistable device set by said square wave signal and reset by said squared-up signal, said bistable device providing a pulsewidth modulated signal, the pulsewidth of which is proportional to said angle.

5. Apparatus according to claim 1 wherein said third means comprises:
   a pair of comparators and a bistable device, the output of a first one of said comparators setting said bistable device and the output of the second comparator resetting said bistable device; and
   an inverter responsive to said second means;
   each of said comparators being connected for response to said first means, said first comparator being connected for response to said second means, and said second comparator being connected for response to said inverter, whereby said first comparator provides an output when the instantaneous magnitude of said sinusoidal signal becomes as positive as the magnitude of said DC signal and said second comparator provides an output when the instantaneous magnitude of said sinusoidal signal becomes as negative as the inverse of said DC signal, the output of said bistable device comprising said square wave signal.

* * * * *